Patented Nov. 13, 1923.

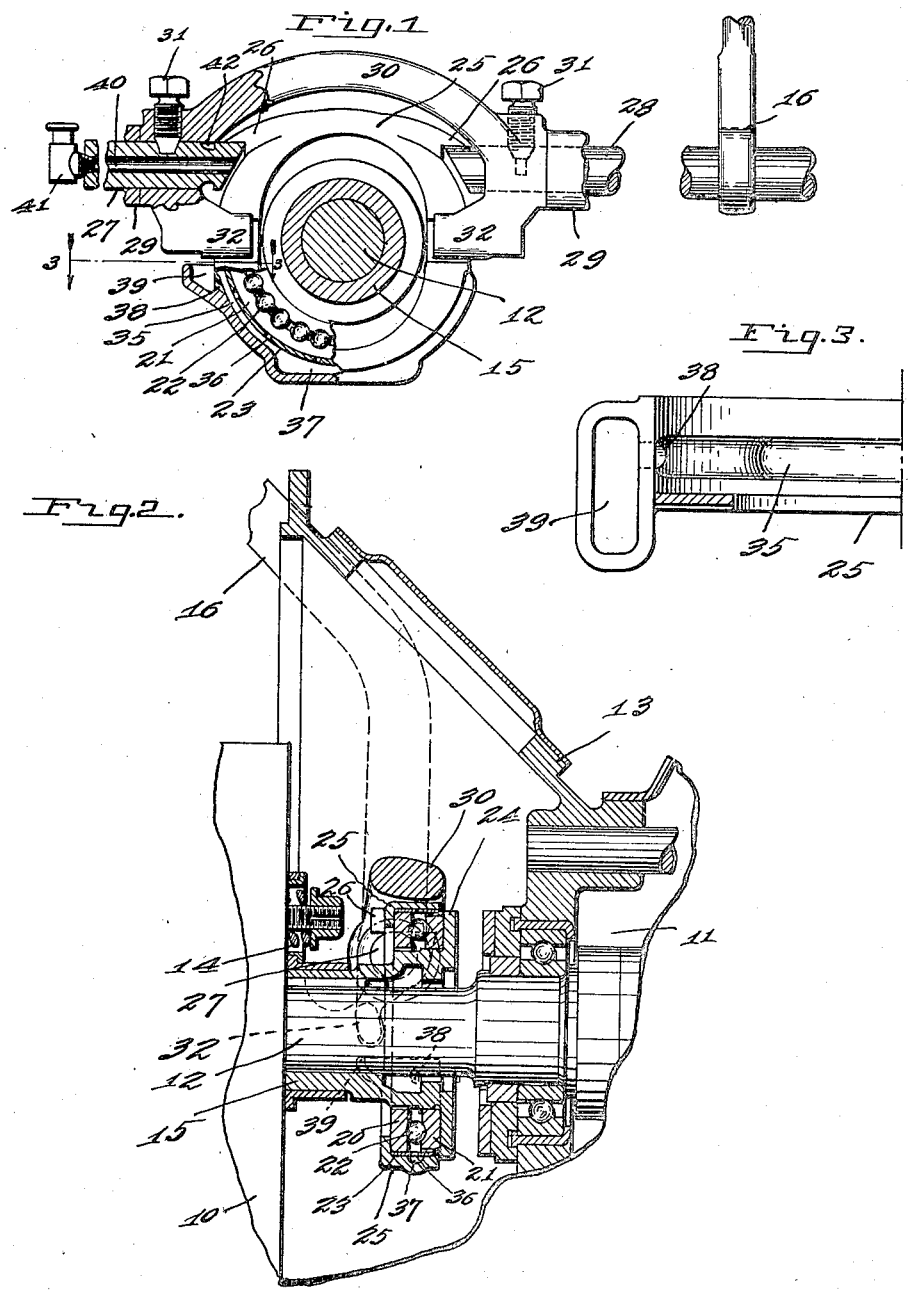

1,473,801

UNITED STATES PATENT OFFICE.

SAMUEL O. WHITE AND ARMYDIS E. STURDIVANT, OF MUNCIE, INDIANA, ASSIGNORS TO WARNER GEAR COMPANY, OF MUNCIE, INDIANA, A CORPORATION OF INDIANA.

CLUTCH-ACTUATING THRUST BEARING.

Application filed December 13, 1919. Serial No. 344,744.

*To all whom it may concern:*

Be it known that we, SAMUEL O. WHITE and ARMYDIS E. STURDIVANT, citizens of the United States, residing at Muncie, in the county of Delaware and State of Indiana, have invented a new and useful Clutch-Actuating Thrust Bearing, of which the following is a specification.

It is the object of our invention positively to lubricate ball thrust bearings used for actuating clutches, particularly automobile clutches, and to provide for such a bearing a mounting in which the weight of the bearing is carried externally and the bearing is not required to carry its own weight; and to limit the motion to one part of the ball bearing while the other is held stationary, so that the heating which is frequently caused in clutch-actuating bearings by friction between the clutch-releasing lever and the directly associated bearing part, if the latter can rotate, is avoided.

A ball thrust bearing does not require a great deal of lubrication; but it requires some lubrication, and the method ordinarily used of providing through the shaft of the main transmission gear a hole which at one end opens in the transmission gear box and at the other opens outwardly in the plane of the thrust bearing, with the expectation that the oil in the transmission will be thrown out through this hole by centrifugal force, has been found in practice to be very unsatisfactory and to provide too much lubrication under some circumstances and none at all under others. By our present invention we provide direct lubrication for this thrust bearing.

The thrust bearing ordinarily used, and which we also use, consists of a pair of races grooved on their adjacent axial ends to receive a set of balls. Such a bearing is not well adapted to carry its own weight when rotating on edge. By our present invention we provide supports for both these races, outside of the bearing itself, so that the bearing will not be required to carry its own weight.

The ordinary practice has been to allow the ball race which co-operates with the driver's clutch pedal to rotate when the driver's foot is not on such pedal, because the fingers which the pedal actuates for engaging such race bear thereon very lightly or not at all under those circumstances. As a result, when the clutch pedal is suddenly pushed down by the driver's foot, the stationary fingers of the clutch pedal are brought into sudden and forcible engagement with the rotating race, not only with great wear but with great friction, sometimes resulting in heating the bearing sufficiently to draw the temper in the balls thereof. We avoid this by preventing from rotating that race which co-operates with the fingers of the clutch pedal yoke, which race we mount so that it is rectilinearly movable axially and is externally supported as already stated.

The accompanying drawing illustrates our invention. Fig. 1 is a front elevation, in partial section, of a clutch-actuating bearing and its mounting constructed in accordance with our invention; Fig. 2 is a vertical central section through such bearing and its mounting, and parts of the neighboring transmission and clutch; and Fig. 3 is a fragmentary section on the line 3—3 of Fig. 1.

While our device is applicable to any style of transmission, we have shown it as one in which the transmission is mounted forward in the automobile and in the same unit with the clutch. The clutch 10 is connected to the main gear of the transmission 11 by the usual shaft 12, all being shown as within a suitable housing 13. The clutch is spring-pressed to set position, by the usual springs 14, and may be released by sliding axially rearwardly the clutch-releasing sleeve 15. This axial rearward sliding of the sleeve 15 is obtained, as usual, by a clutch pedal 16. All this is common practice, and our invention resides in the mounting and lubrication of the thrust bearing by which the clutch pedal 16 acts on the sleeve 15.

Concentric with the sleeve 15 is the thrust bearing through which such pedal actuates the sleeve. This thrust bearing comprises the usual annular ball races 20 and 21, the balls 22 which run in the grooves in the adjacent axial faces of said races and which may be carried in any suitable ball-retainer, and a soft-metal retaining band 23 which fits tightly on the front race 20 and projects loosely over the rear race 21 and is bent inwardly at its rear end to overlap a chamfer on the rear race to keep the latter from coming out. This bearing, per se, is not new. The rear race 21, which is loose in the band 23, is tight on the sleeve 15; and its rear face bears against an outwardly projecting flange 24 on the rear end of such sleeve, so that such flange may take the thrust from the race 21. The front race 20 is loose on the sleeve 15, but it and the soft-metal retaining band 23 have a tight fit within an annular carrier 25. This carrier surrounds the retaining band 23, and at its forward end has an inwardly projecting flange which bears against the front face of the race 20. The carrier 25 is non-rotatable, and in consequence the front race 20 does not rotate; but this carrier and the front race are movable axially of the shaft 12.

To provide for this, the carrier 25 at its upper part has two laterally projecting lugs 26 in the plane of the carrier, which lugs have plane surfaces on their under side and rest on the adjacent ends of two alined shafts 27 and 28 which are mounted in suitable bearings 29 above and transverse to the shaft 12. The shaft 28 has fixed thereon the clutch pedal 16, so that by the operation of such pedal the shaft 28 is turned through a small angle. As the angular movement of the shafts 27 and 28 is small, the adjacent ends of such shafts are conveniently cut off at an angle, as is clear from Fig. 1, so that the upper parts of such two shafts may come as close to the annular carrier 25 as possible. A yoke 30 overlies the carrier 25 and is mounted on the adjacent ends of the shafts 27 and 28, being clamped at least to the shaft 28, and as shown being clamped to both shafts, in any suitable manner, as by clamping screws 31. The yoke 30 has a pair of downwardly and inwardly projecting fingers 32, which lie in front of the annular carrier 25 at its respective sides substantially in the horizontal plane of the shaft 12 and bear on finished portions on the front face of such carrier.

In consequence, by depressing the clutch pedal 16 the shaft 28 and yoke 30 are turned, in a counter-clockwise direction as seen in Fig. 2, and the fingers 32 push the carrier 25 rearward in a rectilinear line, the lugs 26 sliding on the upper surfaces of the shafts 27 and 28; and as the carrier 25 moves to the rear it acts through the thrust bearing 20—22—21 on the flange 24 to release the clutch. When the clutch pedal is released, the springs 14 move the parts back to normal. The carrier 25 carries the race 20 and holds it from rotation, so that a better bearing action is obtained, and friction between the front race and the yoke fingers on account of rotation of the front race is wholly avoided.

In order to lubricate this bearing, the carrier 25 has an inner circumferentially extending groove 35 in its lower half, which groove communicates with the ball-space between the two races 20 and 21 by radial openings 36 in the soft-metal retaining band 23. At the bottom of the retainer this groove 35 is enlarged into a pocket 37. Oil is supplied to the groove 35 and the pocket 37 in some suitable manner. To this end, in the preferred form, the groove 35 communicates by a hole 38 with an oil cup 39 provided on one side of the carrier 25 so that it underlies the end of the shaft 27 in all positions of the carrier. The shaft 27 is provided with an axial hole 40 through it, and there is mounted in its outer end an oil cup 41, which supplies oil to the hole 40 so that such oil drips from the inner end of the shaft 27 into the cup 39. In order to control the point of dripping, the shaft 27 is provided near its inner end with a circumferential groove 42 which prevents the oil from feeding back along the outside surface of said shaft. The oil which drips off the inner end of the shaft 27 is caught by the cup 39 and fed thereby through the opening 38 into the groove 35 and oil pocket 37, whence enough passes through the openings 36 into the ball-space of the thrust bearing to lubricate the latter. This oil is thrown outward against the inner surface of the retaining band 23 when the shaft 12 is in motion; and collects in the pocket 37 when such shaft is at rest, to be picked up again by the rotating parts when such shaft again starts into operation. It is found in practice that this provides ample lubrication, and that substantially no oil escapes around the rear race 21.

We claim as our invention:

1. In a clutch-actuating thrust bearing, the combination of a clutch-releasing sleeve, a ball thrust bearing one of the races of which is mounted on said sleeve, a carrier in which the other ball race of said bearing is non-rotatably mounted, lugs on said carrier by which it is hung so that it can slide axially of said sleeve, two alined shafts transverse to said sleeve and spaced apart to receive the carrier between them, said lugs resting on the adjacent ends of said shafts, a yoke carried by said shafts and fixed to one of them and having fingers co-operating with said carrier, and a clutch pedal operating the shaft to which said yoke is fixed.

2. In a clutch-actuating thrust bearing, the combination of a clutch-releasing sleeve, a ball thrust bearing one of the races of which is mounted on said sleeve, a carrier in which the other ball race of said bearing is non-rotatably mounted, lugs on said carrier by which it is hung so that it can slide axially of said sleeve, two alined shafts transverse to said sleeve and spaced apart to receive the carrier between them, said lugs resting on the adjacent ends of said shafts, a yoke carried by said shafts and fixed to one of them and having fingers co-operating with said carrier, a clutch pedal operating the shaft to which said yoke is fixed, the other alined shaft being hollow, means for supplying oil therethrough, and a cup on said carrier arranged to catch oil which drips from the end of said hollow shaft, said carrier being provided with an oil passage communicating with said cup and with the ball space of said bearing.

3. In a clutch-actuating thrust bearing, the combination of a clutch-releasing sleeve, a clutch pedal, a ball thrust bearing between said pedal and said sleeve, one race of said bearing being carried by said sleeve, a non-rotating annular carrier movable axially of said sleeve and in which the other ball race of said bearing is mounted, said carrier having in its lower part a circumferentially extending oil passage communicating with the ball space of said thrust bearing, and a retaining band surrounding the ball races to hold them together, said retaining band being provided with openings through which said oil passage communicates with said ball space.

4. I a clutch-actuatng thrust bearing, the combination of a clutch-releasing sleeve, a clutch pedal, a ball thrust bearing between said pedal and said sleeve, one race of said bearing being carried by said sleeve, said bearing having a peripheral retaining band for holding its two races from separation, said retaining band having openings communicating with the ball space of said bearing, and means for supplying oil through certain of the openings to said ball space.

5. In a clutch-actuating thrust bearing, the combination with the thrust bearing proper mounted for wholly rectilinear movement, of a yoke associated with said thrust bearing to actuate it, a support for said yoke including a hollow shaft, and means for supplying oil to said hollow shaft, said thrust bearing being arranged with respect to said hollow yoke-supporting shaft to receive oil therefrom.

6. In a clutch-actuating thrust bearing, the combination with the thrust bearing proper mounted for wholly rectilinear movement, of a yoke associated with said thrust bearing to actuate it, a support for said yoke including a hollow shaft, means for supplying oil to said hollow shaft, and an oil container arranged to recive oil from said hollow shaft and in communication with said thrust bearing.

In witness whereof, we have hereunto set our hands at Muncie, Indiana, this sixth day of December, A. D. one thousand nine hundred and nineteen.

SAMUEL O. WHITE.
ARMYDIS E. STURDIVANT.